United States Patent [19]

Kloster

[11] Patent Number: 4,608,754
[45] Date of Patent: Sep. 2, 1986

[54] POWER DRIVEN TUBE CUTTER

[76] Inventor: Kenneth D. Kloster, 6649 Millridge, Maumee, Ohio 43537

[21] Appl. No.: 475,908

[22] Filed: Mar. 16, 1983

[51] Int. Cl.[4] ............................................. B23D 21/06
[52] U.S. Cl. ..................................................... 30/92
[58] Field of Search ............... 30/92, 272 R, 289, 500, 30/282, 278, 241, 180, 182, 212, 210; 83/580, 639, 588

[56] References Cited

U.S. PATENT DOCUMENTS 2,765,036 10/1956 Harper .................................. 83/588
3,807,046 4/1974 Igyarto et al. .......................... 30/92

Primary Examiner—Douglas D. Watts
Attorney, Agent, or Firm—Marshall & Melhorn

[57] ABSTRACT

The present invention relates to a power driven tube cutter which can be effectively utilized to sever automotive exhaust pipes, for example. The tube cutter includes a workpiece engaging member adapted to engage the exhaust pipe, and a cutting blade mounted for movement torward and away from the workpiece engaging member. In the preferred embodiment of the invention, a pneumatic power driver is utilized to advance the cutting blade toward the workpiece engaging member to sever the pipe. A biasing return spring is provided for withdrawing the cutting blade from between the two severed portions of the pipe.

6 Claims, 3 Drawing Figures

POWER DRIVEN TUBE CUTTER

BACKGROUND OF THE INVENTION

The present invention relates generally to a tube cutting device and, in particular, to a tube cutter for severing automotive exhaust pipes, for example.

Automotive repair shops which are equipped to service automotive exhaust systems typically have some means for severing the exhaust or tail pipes in order to quickly remove the old exhaust systems. While a conventional metal cutting saw has been used, it has been found that a cutting torch provides a more effective means for severing such pipes. However, one of the problems associated with using cutting torches relates to the fire hazard presented by such devices. This fire hazard problem is increased in instances wherein the automotive repair shop is connected to other buildings, such as in a shopping mall, for example. Consequently, in these instances, local fire codes often prohibit the use of cutting torches in automotive shops which are connected to or in close proximity with other buildings.

SUMMARY OF THE INVENTION

The present invention relates to a tube cutter which can be effectively utilized to quickly sever a tubular workpiece such as an automotive exhaust pipe, for example. The tube cutter includes a workpiece engaging means adapted to engage the workpiece, and a severing means adapted to be mounted for movement toward and away from the workpiece engaging means.

The tube cutter also includes a drive means having a first mounting plate for supporting the workpiece engaging means, and a second mounting plate for supporting the severing means in spaced relation relative to the workpiece engaging means with the workpiece positioned therebetween. The drive means is operative to move the severing means from a retracted position toward the workpiece and into severing engagement with the workpiece. A biasing means is connected between the first and second mounting plates and is utilized to return the severing means to the retracted, non-operative position.

In the preferred embodiment of the invention, the severing means is a cutting blade mounted on the second mounting plate and a cutting blade guide is mounted on the first mounting plate for controlling the movement of the blade. Also, a pneumatic power drive unit is utilized for advancing the cutting blade into engagement with the workpiece.

BRIEF DESCRIPTION OF THE DRAWINGS

The above, as well as other features and advantages of the present invention, will become readily apparent to one skilled in the art from reading the following detailed description of the invention when taken in light of the accompanying drawings in which.

DESCRIPTION OF THE PREFERRED EMBODIMENT

Figure 1:
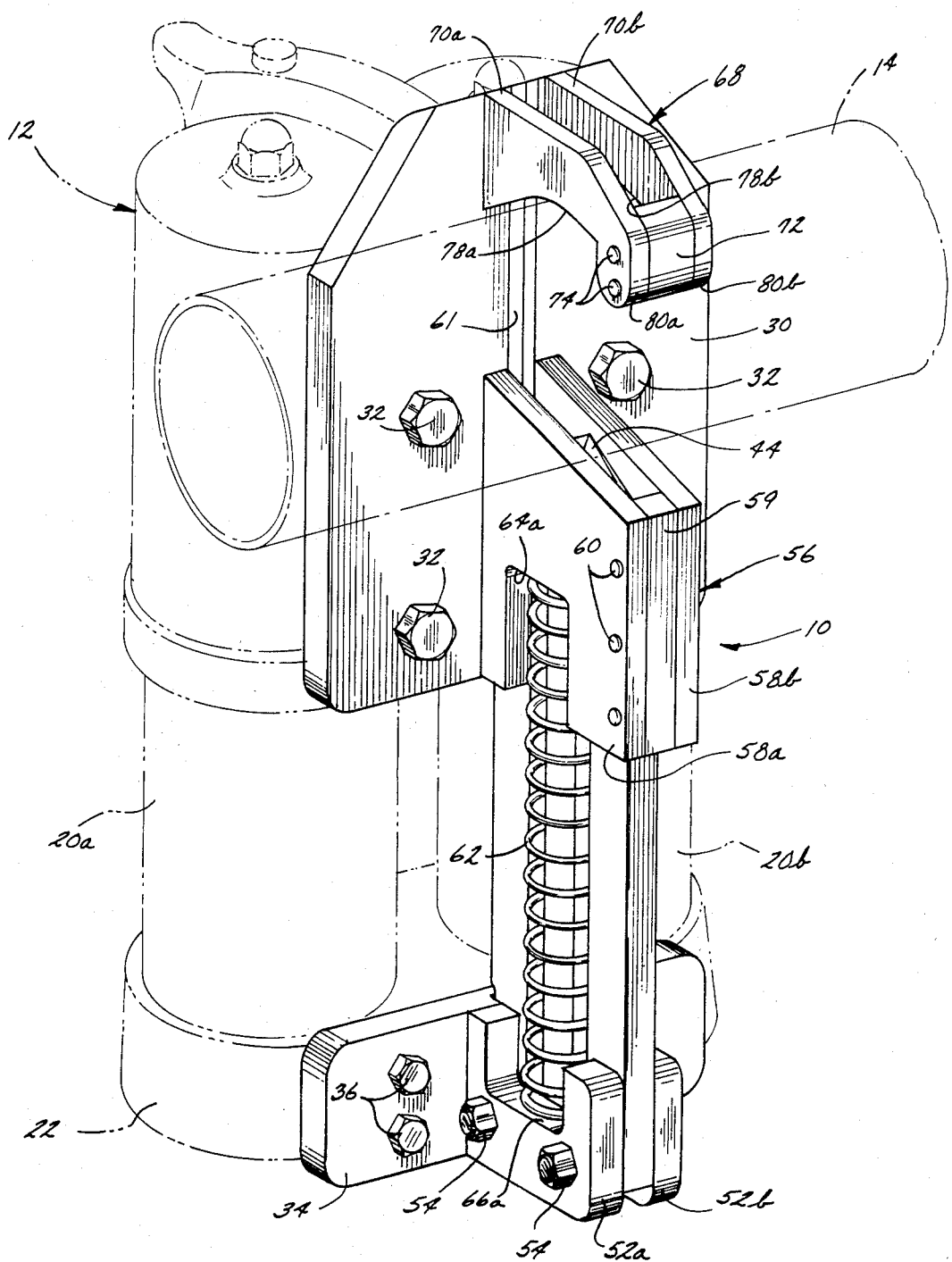
FIG. 1 is a perspective view of a power driven tube cutter embodying the principles of the present invention.

Referring to the drawings, there is shown a tubing cutoff mechanism 10 which is utilized in combination with a power drive means 12 (shown in phantom) to sever a tubular member such as an automobile exhaust pipe 14 (also shown in phantom), for example. While the power drive means 12 can be any type of drive mechanism capable of providing the necessary force to operate the cutoff mechanism 10, the power drive means 12 shown in FIG. 1 is a pneumatic-powered driver of the type disclosed in U.S. Pat. No. 4,034,960, issued to K. D. Kloster and incorporated herein by reference.

Figure 2:
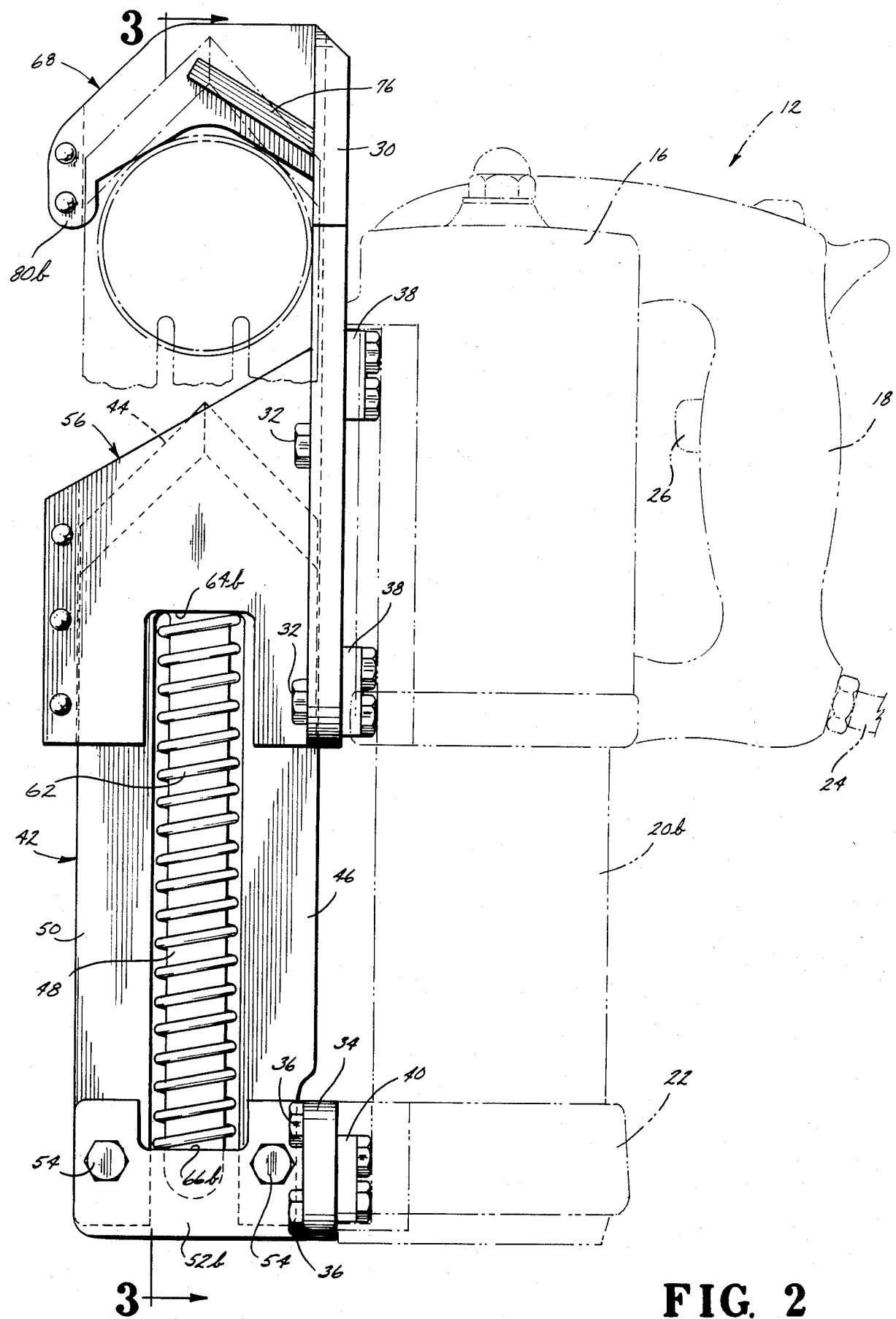
FIG. 2 is a side elevational view of the tube cutter of FIG. 1.

As shown in FIG. 2, the pneumatic-power driver of the above-mentioned Kloster patent includes an upper housing 16 having an integrally formed handle portion 18. The upper housing 16 is adapted to receive the upper ends of a pair of spaced apart cylinders 20a and 20b (shown in FIGS. 1 and 3). The lower ends of cylinders 20a and 20b are connected to a lower cross member 22. The driver 12 is connected to a supply of pressurized fluid by a line 24. A trigger 26 provided in the handle portion 18 is utilized to operate the driver.

In FIG. 2, the driver is shown with the cylinders 20a and 20b in a fully extended position. When the trigger 26 is actuated, the pressurized fluid causes the cylinders 20a and 20b to be retracted into the upper housing 16, thus causing the lower cross member 22 to move toward the housing 16. The Kloster pneumatic-power driver has been found to be an effective means for operating the cutting mechanism 10 when the driver is utilized with fluid supply pressures in the range of 400 p.s.i.

The tubing cutoff mechanism 10 includes an upper mounting plate 30 adapted to be secured to the upper housing 16 of the driver 12 by means of bolts 32, and a lower mounting plate 34 adapted to be secured to the lower cross member 22 by bolts 36. As shown in FIG. 2, a pair of spaced apart guide blocks 38 are bolted to the rear face of the upper mounting plate 30, while a single guide block 40 is bolted to the rear face of the lower mounting plate 34. The guide blocks 38 are adapted to abut against the side edge of the upper housing 16, while the guide block 40 abuts against the side edge of the lower cross member 22. The guide blocks 38 and 40 are positioned on their respective mounting plates to provide proper alignment between the upper and lower mounting plates. It will be appreciated that, in the event a power drive means different than the one illustrated is utilized, it may be necessary to modify the mounting arrangement shown in the drawings.

The cutoff mechanism 10 includes an elongate cutting blade 42 having an inverted V-shaped upper cutting edge 44 and three downwardly extending legs, an inner leg 46, a center leg 48, and an outer leg 50. The extreme lower ends of the legs 46 and 50 are secured between a pair of spaced apart lower flange members 52a and 52b by means of threaded fasteners 54. The inner ends of the flange members 52a and 52b are secured to the front face of the lower mounting plate 34 by welding, for example.

The upper end of the cutting blade 42 is slidably positioned within a blade guide 56. The blade guide 56 includes a pair of spaced apart plates 58a and 58b having their inner edges secured to the upper mounting plate 30 by welding, for example. A spacer 59 is positioned between the outer edges of the plates 58a and 58b which are secured together by suitable fasteners 60. The upper mounting plate 30 is provided with an elongate slot 61 which is adapted to receive the edge portion of the cutting blade inner leg 46.

The cutting blade 42 is normally maintained in the retracted position shown in FIG. 1 by a biasing coil spring 62 positioned between the blade guide 56 and the lower flange members 52a and 52b. The spring 62 is adapted to be slipped over the center leg 48 of the blade 42. The plates 58a and 58b of the blade guide 56 are provided with downwardly facing notched portions 64a and 64b which function as an upper spring seat, while the lower flange members 52a and 52b are provided with upwardly facing notched portions 66a and 66b which function as a lower spring seat. The spring 62 exerts a force which urges cutting blade 42 downwardly to the retracted position shown in the drawings. As will be discussed, the spring 62 is selected such that the force exerted by the spring is sufficiently large to withdraw the upper end of the cutting blade from between the two severed portions of tubing.

Figure 3:
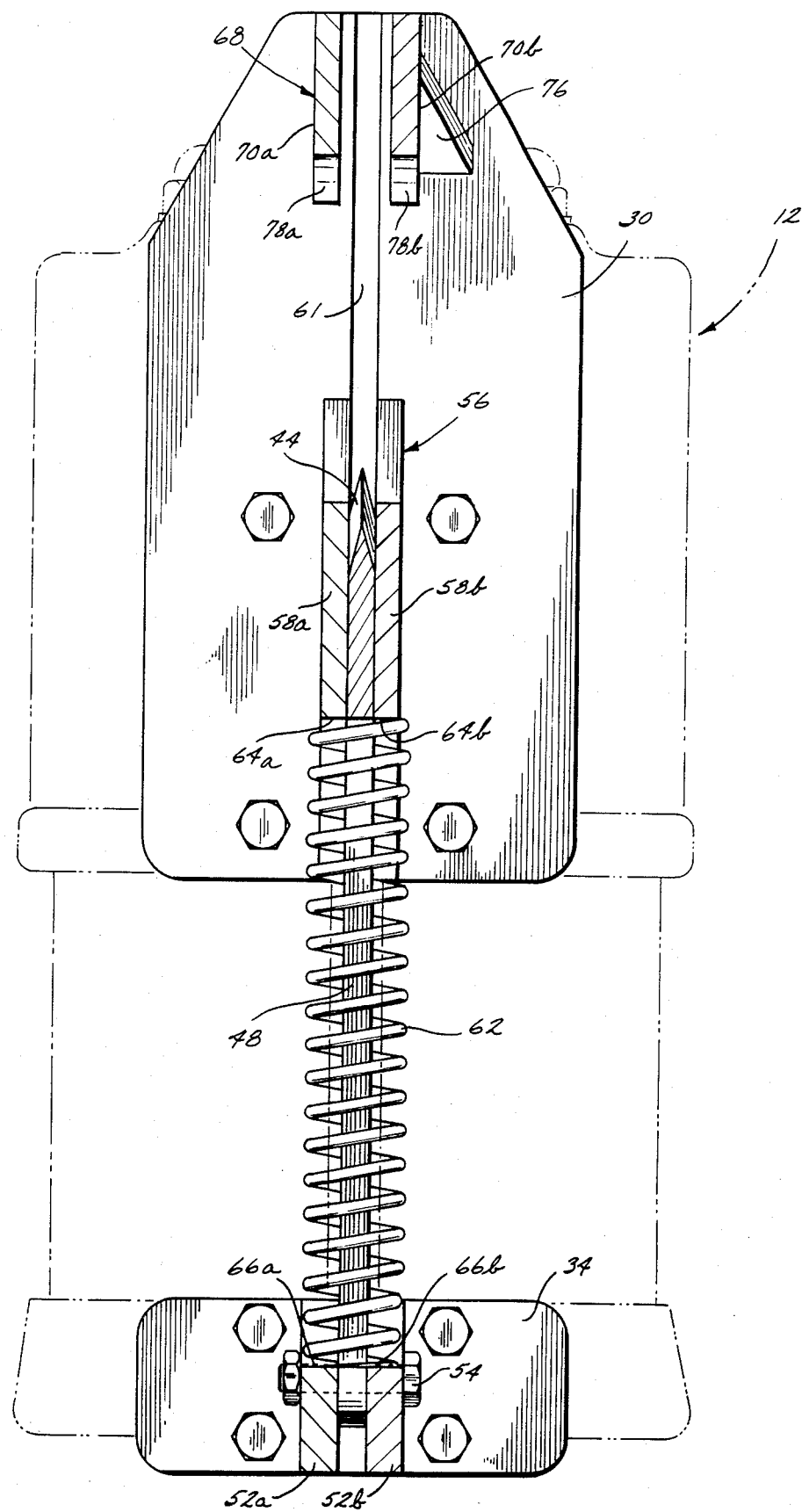
FIG. 3 is a front sectional view of the tube cutter taken along the line 3—3 of FIG. 2.

A workpiece engaging means 68 is secured to the upper end of the upper mounting plate 30. The workpiece engaging means 68 includes a pair of spaced apart support members or plates 70a and 70b having their inner ends secured to the mounting plate 30 by welding, for example. A spacer 72 is positioned between the outer edges of the plates 70a and 70b which are secured together by suitable fasteners 74. As shown in FIG. 3, a triangular-shaped bracing member 76 has one edge secured to the plate 30 and another edge secured to the plate 70b. The plates 70a and 70b include downwardly facing surfaces 78a and 78b of a generally inverted V-shape which are adapted to engage a workpiece such as the tube 14, as shown in FIG. 2. The extreme outer ends of the plates 70a and 70b are provided with downwardly extending lip portions 80a and 80b.

In operation, the tube 14 which is to be severed is positioned between the workpiece engaging means 68 and the cutting blade guide 56 and is engaged with the downwardly facing surfaces 78a and 78b, as shown in FIGS. 1 and 2. Next, the operator actuates the trigger 26 of the power drive means 12 to cause the cutting blade 42 to be forced upwardly to sever the tube 14. When the cutting blade 42 is fully advanced, the cutting edge 44 is positioned between the spaced apart plates 70a and 70b of the workpiece engaging means 68, as shown in phantom in FIG. 2. Once the blade 42 has severed the tube 14, the operator releases the trigger 26 and the spring 62, which has been compressed during the severing operation, urges the lower mounting plate 34 downwardly to withdraw the cutting blade 42 from between the two severed portions of the tube.

It will be appreciated that, while the present invention has been described as a device for cutting a tubular member such as an automotive exhaust pipe, the cutting device can also be utilized to sever other types of workpieces such as PVC plumbing tubing, for example.

In accordance with the provisions of the patent statutes, the principles and mode of operation of the invention have been described and illustrated in what is considered to represent its preferred embodiment. It should, however, be understood that the invention may be practiced otherwise than as specifically described without departing from its spirit or scope.

What is claimed is:

1. An apparatus for severing a tubular workpiece comprising:
    workpiece engaging means adapted to securely engage the workpiece, said workpiece engaging means provided with a channel portion for receiving and retaining the tubular workpiece during the severing operation;
    a cutting blade having a cutting edge adapted to be mounted for movement toward and away from said workpiece engaging means;
    drive means including a first mounting means for supporting said workpiece engaging means and a second mounting means for supporting said cutting blade in spaced relationship relative to said workpiece engaging means with the workpiece positioned therebetween, said drive means being operative to move said second mounting means toward said first mounting means to cause said cutting edge of said cutting blade to move toward said workpiece engaging means and into severing engagement with the workpiece; and
    means connected between said first and second mounting means for moving said second mounting means and said cutting blade away from said first mounting means and said workpiece engaging means.

2. An apparatus according to claim 1 including guide block means secured to said first and second mounting means and engageable with said drive means for properly positioning said first and second mounting means relative to each other.

3. An apparatus according to claim 2 including a cutting blade guide means secured to said first mounting means for guiding said blade toward and away from said workpiece engaging means, said guide means including a pair of spaced apart plate members mounted on opposite sides of said cutting blade, said plate members positioned on said first mounting means such that at least a substantial portion of said cutting edge is located between said plate members when said blade is in a non-actuated position.

4. An apparatus according to claim 1 wherein said biasing spring is a helical coil spring which is maintained in compression between said first and second mounting means.

5. An apparatus according to claim 1 wherein said workpiece engaging means includes a pair of spaced apart support members, each having a channel portion formed therein for receiving and retaining the tubular workpiece during the severing operation, said cutting edge of said cutting blade adapted to extend between said support members during the severing operation.

6. An apparatus according to claim 1 wherein said means for moving said second mounting means and said cutting blade away from said first mounting means and said workpiece engaging means is a biasing spring connected between said first and second mounting means.

* * * * *